United States Patent
Vogt et al.

(10) Patent No.: US 11,001,032 B2
(45) Date of Patent: *May 11, 2021

(54) SINGLE-PLY RESILIENT TISSUE PRODUCTS

(71) Applicant: Kimberly-Clark Worldwide, Inc., Neenah, WI (US)

(72) Inventors: Kevin Joseph Vogt, Neenah, WI (US); Mark Alan Burazin, Oshkosh, WI (US); Jeffrey Dean Holz, Sherwood, WI (US); Mark William Sachs, Appleton, WI (US); Priya Pari Bhagat, Mobile, AL (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,127

(22) Filed: Nov. 26, 2019

(65) Prior Publication Data

US 2020/0094513 A1  Mar. 26, 2020

Related U.S. Application Data

(62) Division of application No. 16/467,547, filed as application No. PCT/US2018/033606 on May 21, 2018, now Pat. No. 10,538,053.

(Continued)

(51) Int. Cl.
*D21F 11/00* (2006.01)
*D21H 27/00* (2006.01)
(Continued)

(52) U.S. Cl.
CPC .............. *B32B 5/02* (2013.01); *D03D 1/0094* (2013.01); *D03D 3/08* (2013.01); *D21F 7/086* (2013.01);
(Continued)

(58) Field of Classification Search
CPC ..... D21F 11/145; D21F 11/006; D21G 1/006; D21G 1/0066; D21H 27/00; D21H 27/002; D21H 27/004; D21H 27/02; D21H 27/005

See application file for complete search history.

(56) References Cited

U.S. PATENT DOCUMENTS 3,738,905 A    6/1973  Thomas
7,935,221 B2 *  5/2011  Allen ................... D21F 11/14
                                                162/116

(Continued)

FOREIGN PATENT DOCUMENTS

CN        101675868 A     3/2010
WO    WO-2016085704 A1 *  6/2016  ............ D21F 11/006
(Continued)

OTHER PUBLICATIONS

Co-pending U.S. Appl. No. 16/467,542, filed Jun. 7, 2019, by Vogt et al. for "Multi-Ply Resilient Tissue Products."

*Primary Examiner* — Jose A Fortuna
(74) *Attorney, Agent, or Firm* — Kimberly-Clark Worldwide, Inc.

(57) ABSTRACT

The present invention provides tissue webs and products having improved z-directional properties. The improved z-directional properties may be achieved by providing the structure with a unique three-dimensional surface topography, which increases the structure's Exponential Compression Modulus (K) and Caliper Under Load ($C_0$). By improving both K and $C_0$, the present inventors have also been able to provide tissue structures with relatively high Compression Energy (E), which enables the structures to be calendered at high loads without significant loss of sheet bulk or degradation of strength.

15 Claims, 7 Drawing Sheets

Related U.S. Application Data

(60) Provisional application No. 62/509,310, filed on May 22, 2017.

(51) Int. Cl.
    *D21H 27/02* (2006.01)
    *B32B 5/02* (2006.01)
    *D21F 11/14* (2006.01)
    *D03D 1/00* (2006.01)
    *D03D 3/08* (2006.01)
    *D21F 7/08* (2006.01)

(52) U.S. Cl.
    CPC .......... *D21F 11/006* (2013.01); *D21F 11/145* (2013.01); *D21H 27/002* (2013.01); *D21H 27/005* (2013.01); *D21H 27/02* (2013.01); *B32B 2555/00* (2013.01); *D03D 2700/0162* (2013.01); *D03D 2700/02* (2013.01)

(56) References Cited

U.S. PATENT DOCUMENTS

| | | | |
|---|---|---|---|
| 9,512,572 B2 | 12/2016 | Weaver et al. | |
| 9,752,281 B2 * | 9/2017 | Manifold | D21F 11/145 |
| 10,487,454 B2 * | 11/2019 | Lindsay | D21H 11/04 |
| 10,538,053 B2 * | 1/2020 | Vogt | D21F 11/006 |
| 10,610,063 B2 * | 4/2020 | Vogt | D21H 27/40 |
| 2004/0101704 A1 | 5/2004 | Hermans et al. | |
| 2007/0131366 A1 | 6/2007 | Underhill et al. | |
| 2008/0110591 A1 | 5/2008 | Mullally et al. | |
| 2010/0051217 A1 * | 3/2010 | Allen | D21G 1/00 162/116 |
| 2010/0051218 A1 * | 3/2010 | Allen | D21F 11/14 162/116 |
| 2015/0247290 A1 | 9/2015 | Burazin et al. | |
| 2015/0327731 A1 | 11/2015 | Burazin et al. | |
| 2017/0049280 A1 | 2/2017 | Weaver et al. | |
| 2019/0136457 A1 * | 5/2019 | Lindsay | D21H 27/00 |
| 2019/0299562 A1 * | 10/2019 | Vogt | D21H 27/02 |
| 2020/0000295 A1 * | 1/2020 | Vogt | D21H 27/02 |
| 2020/0094513 A1 * | 3/2020 | Vogt | D21H 27/002 |
| 2020/0187725 A1 * | 6/2020 | Vogt | A47K 10/16 |
| 2020/0240086 A1 * | 7/2020 | Lindsay | D21H 11/20 |
| 2020/0270812 A1 * | 8/2020 | Holz | D21H 27/02 |

FOREIGN PATENT DOCUMENTS

| | | | | |
|---|---|---|---|---|
| WO | 2017209739 A1 | 12/2017 | | |
| WO | WO-2017209739 A1 * | 12/2017 | ............. | D21H 21/20 |
| WO | 2018217599 A1 | 11/2018 | | |
| WO | 2018217602 A1 | 11/2018 | | |
| WO | WO-2018217602 A1 * | 11/2018 | ............. | D21H 25/02 |

* cited by examiner

SINGLE-PLY RESILIENT TISSUE PRODUCTS

RELATED APPLICATIONS

The present application is a divisional application and claims priority to U.S. patent application Ser. No. 16/467,547, filed on Jun. 7, 2019, which is a national-phase entry, under 35 U.S.C. § 371, of PCT Patent Application No. PCT/US18/33606, filed on May 21, 2018, which claims the benefit of U.S. Provisional Application No. 62/509,310, filed May 22, 2017, all of which are incorporated herein by reference.

BACKGROUND

Today there is an ever increasing demand for soft, bulky tissue products, which also have sufficient tensile strength to withstand use. Traditionally the tissue maker has solved the problem of increasing sheet bulk without compromising strength and softness by adopting tissue making processes that only minimally compress the tissue web during manufacture, such as through-air drying. Although such techniques have improved sheet bulk, they have their limitations. For example, to obtain satisfactory softness the through-air dried tissue webs often need to be calendered, which may negate much of the bulk obtained by through-air drying. Calendering may also degrade strength to a point that the product fails in use. Thus the tissue maker, and particularly makers of through-air dried tissue products, is often faced with trading off important product properties such as strength, softness and bulk.

Complicating matters further is the consumer's desire for tissues that are aesthetically pleasing with good handfeel. Again, the tissue maker is forced to balance competing properties—provide a smooth sheet with good handfeel, but poor aesthetics or a visually appealing sheet having a high degree of topography, but poor handfeel.

Accordingly, there exists a need for tissue structures that are not only soft and strong, but also, smooth, bulky and aesthetically pleasing.

SUMMARY

It has now been surprisingly discovered that tissue webs and products, such as rolled bath tissue or towel products, having many of consumer desired attributes—softness, strength, bulk, smoothness and aesthetics—may be provided by improving the z-directional properties, such as compression modulus and compression energy, of the structure. More particularly, it has been discovered that tissue webs and products having improved z-directional properties may be formed by non-compressively dewatering the nascent tissue web while supporting the web with a structured papermaking fabric comprising a plurality of elements having a height less than about 0.7 mm, such as from about 0.4 to about 0.7 mm. The elements, which extend in the z-direction above the plane of the papermaking fabric provide the nascent tissue web with a three-dimensional topography and improved z-directional properties.

Accordingly, in one embodiment the present invention provides tissue products having aesthetically appealing three-dimensional surface topography and improved z-directional properties, such as a Compression Energy (E) greater than about 0.0100 J/mm$^2$, such as from about 0.0100 to about 0.0130 J/mm$^2$. The improved z-directional properties result in many consumer preferred attributes and improve the processing of the tissue products. For example, the instant tissue products can withstand high calender loads, which yields a tissue product that is relatively smooth and soft.

In other embodiments the present disclosure provides a single-ply non-compressively dewatered tissue product having a basis weight from about 25 to about 60 grams per square meter (gsm), a sheet bulk greater than about 15 cc/g and a Compression Energy (E) greater than about 0.0100 J/mm$^2$, such as from about 0.0100 to about 0.0130 J/mm$^2$.

In another embodiment the invention provides a single-ply non-compressively dewatered tissue product having a basis weight from about 25 to about 60 gsm, a geometric mean tensile (GMT) strength greater than about 500 g/3", a Stiffness Index less than about 10, such as from about 3.0 to about 10, and more preferably from about 4.0 to about 6.0, and a Compression Energy (E) greater than about 0.0100 J/mm$^2$, such as from about 0.0100 to about 0.0130 J/mm$^2$.

In still other embodiments the present invention provides a single-ply through-air dried tissue product having a first side with a topographical pattern disposed thereon, the pattern comprising a plurality of substantially machine direction oriented line elements, the product having a basis weight from about 25 to about 60 gsm, a GMT greater than about 500 g/3", a Stiffness Index less than about 10.0, such as from about 3.0 to about 10.0, and more preferably from about 4.0 to about 6.0, and a Compression Energy (E) greater than about 0.0100 J/mm$^2$, such as from about 0.0100 to about 0.0130 J/mm$^2$.

In yet other embodiments the present invention provides a single-ply through-air dried tissue product having a first side with a topographical pattern disposed thereon, the pattern comprising a plurality of substantially machine direction oriented line elements, the product having a basis weight from about 25 to about 60 gsm, a GMT greater than about 500 g/3", a caliper greater than about 600 μm, such as from about 600 and to about 700 μm, and a TS7 value less than about 10.0.

In still other embodiments the present invention provides a single-ply non-compressively dewatered tissue product having a caliper greater than about 600 μm, such as from about 600 and to about 700 μm, a Stiffness Index less than about 7.5 and more preferably less than about 6.0, and a Compression Energy (E) from about 0.0100 to about 0.0130 J/mm$^2$.

In other embodiments the invention provides a rolled tissue product comprising a single-ply non-compressively dewatered tissue web wound into a roll, the web having a basis weight from about 25 to about 60 gsm, a GMT from about 800 to about 1,500 g/3", a Stiffness Index less than about 10, and a Compression Energy (E) greater than about 0.0100 J/mm$^2$, such as from about 0.0100 to about 0.0130 J/mm$^2$, the wound roll having a Firmness less than about 8.0 mm and a Roll Structure greater than about 1.25.

In still other embodiments the present invention provides a method of manufacturing a soft and resilient tissue product comprising the steps of forming a fiber slurry, depositing the fiber slurry on a forming fabric, partially dewatering the slurry to form a wet tissue web, transferring the wet tissue web to a through-air drying fabric comprising a support structure and a plurality of linear elements extending in the z-direction therefrom, the elements having a height from about 0.4 to about 0.7 mm, through-air drying the wet tissue web to form a dried tissue web, calendering the dried tissue web and winding the calendered web into a rolled tissue product. In particularly preferred embodiments the foregoing method results in a rolled tissue product having a Firmness less than about 7.5 mm, wherein the tissue product has a sheet bulk greater than about 15.0 cc/g and a Stiffness Index less than about 7.5.

In yet other embodiments the present invention provides a method of manufacturing a soft and resilient tissue product comprising the steps of forming a fiber slurry, depositing the fiber slurry on a forming fabric, partially dewatering the slurry to form a wet tissue web, transferring the wet tissue web to a through-air drying fabric comprising a support structure and a plurality of linear elements extending in the z-direction therefrom, the elements having a height from about 0.5 to about 0.7 mm, through-air drying the wet tissue web to form a dried tissue web, calendering the dried tissue web at a calender load greater than about 40 pli, and more preferably greater than about 100 pli, such as from about 100 to about 200 pli and more preferably from about 120 to about 160 pli, and winding the calendered web into a rolled tissue product.

Tissue products manufactured according to the foregoing embodiments generally have a high degree of sheet bulk, such as greater than about 14.0 cc/g and more preferably greater than about 15.0 cc/g, despite being subjected to relatively high levels of calendering, and may have low TS7 values, such as less than about 10.5 at relatively modest GMT, such as from about 500 to about 1,100 g/3".

Other features and aspects of the present invention are discussed in greater detail below.

DEFINITIONS

Figure 1:
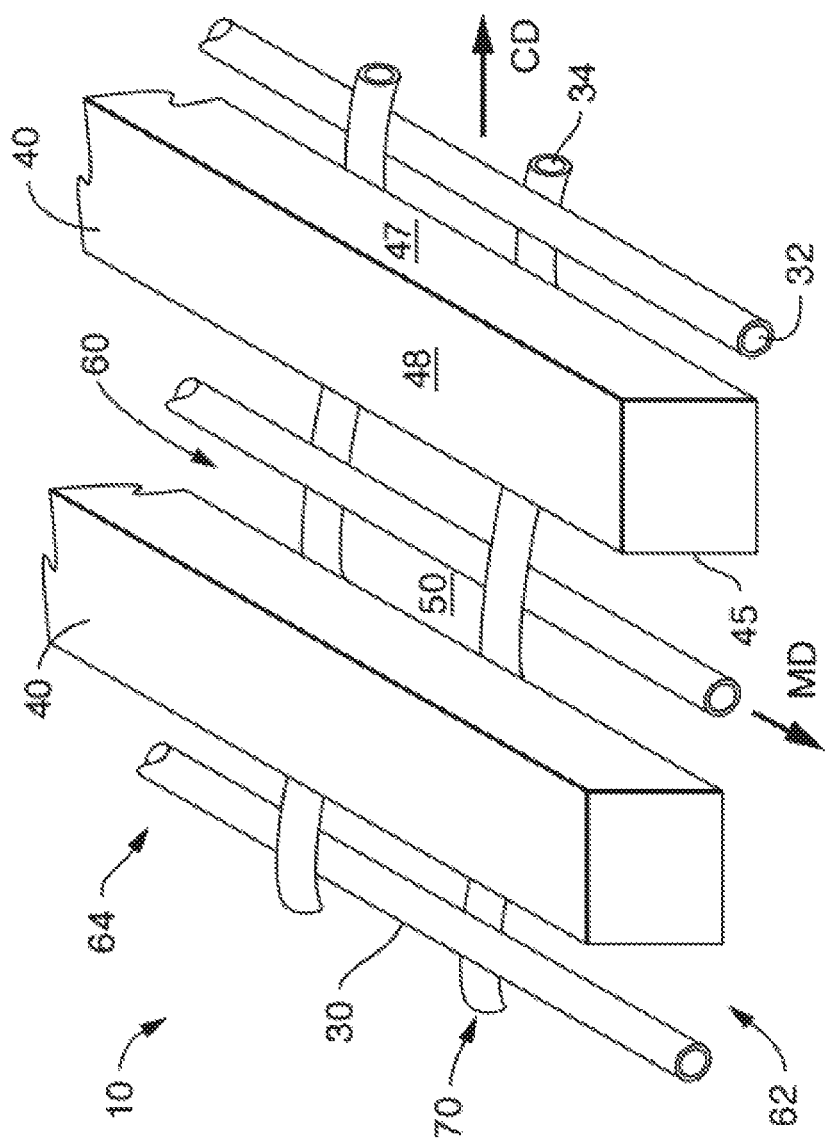
FIG. 1 is a view of a fabric useful in the manufacture of tissue webs according to one embodiment of the present invention.

As used herein the term "tissue web" refers to a structure comprising a plurality of elongated particulates having a length to diameter ratio greater than about 10 such as, for example, papermaking fibers and more particularly pulp fibers, including both wood and non-wood pulp fibers, and synthetic staple fibers. A non-limiting example of a tissue web is a wet-laid sheet material comprising pulp fibers.

As used herein the term "tissue product" refers to products made from tissue webs and includes bath tissues, facial tissues, paper towels, industrial wipers, foodservice wipers, napkins, medical pads, and other similar products. Tissue products may comprise one, two, three or more plies.

As used herein the term "ply" refers to a discrete tissue web used to form a tissue product. Individual plies may be arranged in juxtaposition to each other.

As used herein the term "layer" refers to a plurality of strata of fibers, chemical treatments, or the like within a ply.

As used herein the "topographical pattern" generally refers to a pattern disposed on at least one surface of the tissue web in accordance with the present invention. The topographical pattern generally texturizes the surface of the tissue web providing the surface with a first and a second elevation. The topographical pattern may comprise a plurality of line elements, such as a plurality of line elements that are substantially oriented in the machine direction of the tissue web.

As used herein the term "line element" refers to a topographical pattern in the shape of a line, which may be a continuous, discrete, interrupted, and/or partial line with respect to a tissue web on which it is present. The line element may be of any suitable shape such as straight, bent, kinked, curled, curvilinear, serpentine, sinusoidal, and mixtures thereof that may form regular or irregular periodic or non-periodic lattice work of structures wherein the line element exhibits a length along its path of at least 10 mm. In one example, the line element may comprise a plurality of discrete elements, such as dots and/or dashes for example, that are oriented together to form a line element.

As used herein the term "continuous element" refers to an element disposed on a carrier structure useful in forming a tissue web or a topographical pattern that extends without interruption throughout one dimension of the carrier structure or the tissue web.

As used herein the term "discrete element" refers to separate, unconnected elements disposed on a carrier structure useful in forming a tissue web or on the surface of a tissue web that do not extend continuously in any dimension of the support structure or the tissue web as the case may be.

As used herein the term "curvilinear decorative element" refers to any line or visible pattern that contains either straight sections, curved sections, or both that are substantially connected visually. Curvilinear decorative elements may appear as undulating lines, substantially connected visually, forming signatures or patterns.

As used herein "decorative pattern" refers to any non-random repeating design, figure, or motif. It is not necessary that the curvilinear decorative elements form recognizable shapes, and a repeating design of the curvilinear decorative elements is considered to constitute a decorative pattern.

As used herein the term "basis weight" generally refers to the bone dry weight per unit area of a tissue and is generally expressed as grams per square meter (gsm). Basis weight is measured using TAPPI test method T-220. While basis weight may be varied, tissue products prepared according to the present invention generally have a basis weight greater than about 10 gsm, such as from about 10 to about 60 gsm, more preferably from about 25 to about 55 gsm and still more preferably from about 30 to about 50 gsm.

As used herein the term "caliper" is the representative thickness of a single sheet (caliper of tissue products comprising two or more plies is the thickness of a single sheet of tissue product comprising all plies) measured in accordance with TAPPI test method T402 using an EMVECO 200-A Microgage automated micrometer (EMVECO, Inc., Newberg, Oreg.). The micrometer has an anvil diameter of 2.22 inches (56.4 mm) and an anvil pressure of 132 grams per square inch (per 6.45 square centimeters) (2.0 kPa). The caliper of a tissue product may vary depending on a variety of manufacturing processes and the number of plies in the product, however, tissue products prepared according to the present invention generally have a caliper greater than about 500 μm, more preferably greater than about 575 μm and still more preferably greater than about 600 μm, such as from about 500 to about 1,000 μm and more preferably from about 600 to about 750 μm.

As used herein the term "sheet bulk" refers to the quotient of the caliper (generally having units of μm) divided by the bone dry basis weight (generally having units of gsm). The resulting sheet bulk is expressed in cubic centimeters per gram (cc/g). Tissue products prepared according to the present invention generally have a sheet bulk greater than about 10.0 cc/g, more preferably greater than about 12.0 cc/g and still more preferably greater than about 14.0 cc/g, such as from about 10.0 to about 20.0 cc/g and more preferably from about 12.0 to about 16.0 cc/g.

As used herein, the terms "geometric mean tensile" and "GMT" refer to the square root of the product of the machine direction tensile strength and the cross-machine direction tensile strength of the tissue product. While the GMT may vary, tissue products prepared according to the present invention generally have a GMT greater than about 700 g/3", more preferably greater than about 750 g/3" and still more preferably greater than about 800 g/3", such as from about 700 to about 1,500 g/3".

As used herein, the term "slope" refers to slope of the line resulting from plotting tensile versus stretch and is an output of the MTS TestWorks™ in the course of determining the tensile strength as described in the Test Methods section herein. Slope is reported in the units of grams (g) per unit of sample width (inches) and is measured as the gradient of the least-squares line fitted to the load-corrected strain points falling between a specimen-generated force of 70 to 157 grams (0.687 to 1.540 N) divided by the specimen width. Slopes are generally reported herein as having units of grams (g) or kilograms (kg).

As used herein, the term "geometric mean slope" (GM Slope) generally refers to the square root of the product of machine direction slope and cross-machine direction slope. GM Slope generally is expressed in units of kilograms (kg). While the GM Slope may vary, tissue products prepared according to the present invention generally have a GM Slope less than about 6.5 kg, more preferably less than about 6.0 kg and still more preferably less than about 5.5 kg, such as from about 4.5 to about 6.5 kg.

As used herein, the term "Stiffness Index" refers to GM Slope (having units of kg), divided by GMT (having units of g/3") multiplied by 1,000. While the Stiffness Index may vary, tissue products prepared according to the present invention generally have a Stiffness Index less than about 7.5, more preferably less than about 7.0 and still more preferably less than about 6.0 such as from about 4.5 to about 7.5.

As used herein, the term "Roll Firmness" generally refers to the ability of a rolled tissue product to withstand deflection when impacted, which is determined as described in the Test Methods section.

As used herein, the term "Roll Structure" generally refers to the overall appearance and quality of a rolled tissue product and is the product of Roll Bulk (expressed in cc/g) and caliper (expressed in cm) divided by Firmness (expressed in cm). Roll Structure is generally referred to herein without reference to units.

As used herein, the terms "T57" and "TS7 value" refer to the output of the EMTEC Tissue Softness Analyzer (commercially available from Emtec Electronic GmbH, Leipzig, Germany) as described in the Test Methods section. TS7 has units of dB V2 rms, however, TS7 may be referred to herein without reference to units. The TS7 value is the frequency peak that occurs around 6.5 kHz on the noise spectrum graph output from the EMTEC Tissue Softness Analyzer. This peak represents the softness of the sample. Generally, softer samples produce a lower TS7 peak. In certain embodiments the invention provides through-air dried tissue products having a TS7 less than about 11.0 and more preferably less than about 10.5, such as from about 8.0 to about 11.0. The foregoing TS7 values are generally achieved at geometric mean tensile strengths from about 500 to about 1,500 g/3".

As used herein, terms "TS750" and "TS750 value" refer to the output of the EMTEC Tissue Softness Analyzer (commercially available from Emtec Electronic GmbH, Leipzig, Germany) as described in the Test Methods section. TS750 has units of dB V2 rms, however, TS750 may be referred to herein without reference to units. The TS750 value is the frequency peak that occurs in the range of 200 to 1,000 Hz. This peak represents the smoothness of the sample. Generally, smoother samples will produce a lower TS750 peak. In certain embodiments the invention provides through-air dried tissue products having a TS750 less than about 85.0 and more preferably less than about 80.0, such as from about 70.0 to about 85.0. The foregoing TS750 values are generally achieved at geometric mean tensile strengths from about 500 to about 1,500 g/3".

As used herein, the term "Stiffness Parameter" (D) refers to the output of the EMTEC Tissue Softness Analyzer (commercially available from Emtec Electronic GmbH, Leipzig, Germany) as described in the Test Methods section. Stiffness Parameter typically has units of mm/N and is a measure of the deformation of a sample under a defined load. While the Stiffness Parameter of tissue webs and products prepared according to the present invention may vary, in certain embodiments, products have a Stiffness Parameter less than about 3.5 mm/N and more preferably less than about 3.0 mm/N, such as from about 2.5 to about 3.5 mm/N and more preferably from about 2.75 to about 3.25 mm/N.

As used herein, the term "through-air dried" generally refers to a method of manufacturing a tissue web where a drying medium, such as heated air, is blown through a perforated cylinder, the embryonic tissue web and the fabric supporting the web. Generally the embryonic tissue web is supported by the fabric and is not brought into contact with the perforated cylinder.

As used herein, the term "S90" generally refers to the smoothness of a tissue web or product and is an output of the FRT MicroSpy® Profile profilometer analysis described in the Test Methods section below. S90 generally has units of millimeters (mm).

As used herein, "noncompressive dewatering" and "noncompressive drying" refer to dewatering or drying methods, respectively, for removing water from tissue webs that do not involve compressive nips or other steps causing significant densification or compression of a portion of the web during the drying or dewatering process. In particularly preferred embodiments the wet web is wet-molded in the process of noncompressive dewatering to improve the three-dimensionality and absorbent properties of the web.

As used herein, the term "Compression Energy" generally refers to the energy required to compress a tissue web or product from an initial caliper under little or no load to a lower caliper under a greater load. Compression Energy (E) is calculated by integrating the compression curve from the initial height down to the compressed caliper as described in the Test Methods section below. Here, "Compression Energy" is calculated from the second compressive cycle. Compression Energy may have units of Joules per square millimeter ($J/mm^2$).

As used herein, the term "Exponential Compression Modulus" (K) generally refers to the dry compression resiliency of a tissue web or product. Exponential Compression Modulus (K) is found by least squares fitting of the caliper (C) and pressure data from a compression curve for a sample as described in the Test Methods section below. Exponential Compression Modulus (K) is dimensionless.

As used herein, the term "Caliper Under Load" ($C_0$) generally refers to the caliper of a stack of ten tissue products under the 0.002 MPa reference pressure and has units of millimeters or microns. The measurement is taken when measuring compression energy described below in the Test Methods section.

DETAILED DESCRIPTION

The present invention provides a variety of novel non-compressively dewatered tissue webs and products having a topographical pattern disposed on at least one surface. The present non-compressively dewatered tissue webs and products have improved z-directional properties, such as relatively high compression energy, which make them more easily processed and convertible to rolled tissue products having good roll structure and firmness. At the same time, the structures and resulting tissue products retain many of desirable attributes, such as high bulk, sufficient strength to withstand use, smoothness and softness.

The improved z-directional properties have been achieved by providing the structure with a unique three-dimensional surface topography. The unique topography increases both the Exponential Compression Modulus (K) and the Caliper Under Load ($C_0$). By improving both K and $C_0$, the present inventors have also been able to provide tissue structures with relatively high compression Energy, which enables the structures to be calendered at high loads without significant loss of sheet bulk or degradation of strength. For example, the inventive structures may be calendered at loads in excess of 100 pli yet retain more than about 65 percent of their initial sheet bulk. When prior art structures are subjected to similar loads they retain less than about 50 percent of their initial sheet bulk.

Further, the ability to calender at high loads without significant loss of sheet bulk or degradation of strength results in tissue products having excellent surface properties, such as improved smoothness (measured as TS750) and softness (measured as TS7). For example, the present invention provides tissue products having a TS7 less than about 10.5 and a TS750 less than about 85.0.

Thus, in certain embodiments, tissue webs and products prepared according to the present invention may have improved Compression Energy (E), such as E greater than about 0.01000 $J/mm^2$, such as from about 0.0100 to about 0.0130 $J/mm^2$ and more preferably from about 0.01100 to about 0.0130 $J/mm^2$. Tissue products having the foregoing Compression Energy generally have an Exponential Compression Modulus (K) greater than about 5.0 and more preferably greater than about 5.2 and still more preferably greater than about 5.3, such as from about 5.0 to about 5.5. In other embodiments the inventive tissue products have a $C_0$ greater than about 9.0 mm and more preferably greater than about 9.4 mm and still more preferably greater than about 9.8 mm, such as from about 9.0 to about 10.2 mm.

Tissue products having improved z-directional properties also have good inter-fiber bonding and bulk. As such inventive tissue products generally have geometric mean tensile strengths greater than about 700 g/3", such as from about 700 to about 1,500 g/3" and more preferably from about 800 to about 1,250 g/3" while having good sheet bulk, such as greater than about 10 cc/g and more preferably greater than about 12 cc/g and still more preferably greater than about 14 cc/g, such as from about 10 to about 18 cc/g and more preferably from about 14 to about 18 cc/g.

In other embodiments, in addition to having good z-directional properties, such as improved E, K and $C_0$, the instant tissue webs and products have relatively low stiffness. For example, in certain embodiments tissue webs and products prepared according to the present invention generally have a Stiffness Index less than about 7.5, more preferably less than about 6.0 and still more preferably less than about 5.0 such as from about 4.5 to about 7.5. These improvements deliver upon consumer's desire for a more cushiony tissue product, with low stiffness and good hand-feel.

Generally the tissue webs of the present invention comprise a three dimension topographical pattern, often referred to herein simply as a topographical pattern, on at least one of its surfaces. Preferably the pattern is imparted during the manufacturing process such as by wet texturing during formation of the web, molding the pattern into the web using a drying fabric or by embossing. The pattern is not the result of printing, which generally would not result in a three dimensional topographical pattern. As such the tissue webs of the present invention are generally free from bonding materials applied to the surface by printing, or the like. Further, tissue webs of the present invention are generally produced without the use of latex bonding materials such as acrylates, vinyl acetates, vinyl chlorides and methacrylates. Rather than having printed patterns the instant tissue webs have patterns that are formed by wet molding and/or through-air drying via a fabric and/or an imprinted through-air drying fabric.

Accordingly, in one embodiment, the topographical pattern is formed during the manufacturing process by molding the tissue web using an endless belt having a corresponding topographical pattern. For example, as illustrated in FIG. 1, the tissue web may be manufactured using an endless belt 10 comprising a continuous three dimensional element 40 also referred to simply as a continuous line element, and a reinforcing structure 30 (also referred to herein as a carrier structure or fabric). The reinforcing structure 30 comprises a pair of opposed major surfaces—a web contacting surface 64 from which the continuous line elements 40 extend and a machine contacting surface 62. Machinery employed in a typical papermaking operation is well known in the art and may include, for example, vacuum pickup shoes, rollers, and drying cylinders. In one embodiment the belt comprises a through-air drying fabric useful for transporting an embryonic tissue web across drying cylinders during the tissue manufacturing process. In such embodiments the web contacting surface 64 supports the embryonic tissue web, while the opposite surface, the machine contacting surface 62, contacts the through-air dryer.

Generally the continuous line element 40 is disposed on the web-contacting surface 64 for cooperating with, and structuring of, the wet fibrous web during manufacturing. In a particularly preferred embodiment the web contacting surface 64 comprises a plurality of spaced apart three dimensional elements distributed across the web-contacting surface 64 of the carrier structure 50 and together constituting from at least about 15 percent of the web-contacting surface, such as from about 15 to about 35 percent, more preferably from about 18 to about 30 percent, and still more preferably from about 20 to about 25 percent of the web-contacting surface.

In addition to continuous line elements 40 the web-contacting surface 64 preferably comprises a plurality of continuous landing areas 60. The landing areas 60 are generally bounded by the elements 40 and coextensive with the top surface plane 50 of the belt 10. Landing areas 60 are generally permeable to liquids and allow water to be removed from the cellulosic tissue web by the application of differential fluid pressure, by evaporative mechanisms, or both when drying air passes through the embryonic tissue web while on the papermaking belt 10 or a vacuum is applied through the belt 10. Without being bound by any particularly theory, it is believed that the arrangement of elements and landing areas allow the molding of the embryonic web causing fibers to deflect in the z-direction and generate the caliper of, and patterns on the resulting tissue web.

The carrier structure 30 has two principle dimensions—a machine direction ("MD"), which is the direction within the plane of the belt 10 parallel to the principal direction of travel of the tissue web during manufacture and a cross-machine direction ("CD"), which is generally orthogonal to the machine direction. The carrier structure 30 is generally permeable to liquids and air. In one particularly preferred embodiment the carrier structure is a woven fabric. The carrier structure may be substantially planar or may have a three dimensional surface defined by ridges. In one embodiment the carrier structure is a substantially planar woven fabric such as a multi-layered plain-woven fabric 30 having base warp yarns 32 interwoven with shute yarns 34 in a 1×1 plain weave pattern. One example of a suitable substantially planar woven fabric is disclosed in U.S. Pat. No. 8,141,595, the contents of which are incorporated herein in a manner consistent with the present invention. In a particularly preferred embodiment, the carrier structure comprises a substantially planar woven fabric wherein the plain-weave load-bearing layer is constructed so that the highest points of both the load-bearing shutes 34 and the load-bearing warps 32 are coplanar and coincident with the plane 70.

Figure 2:
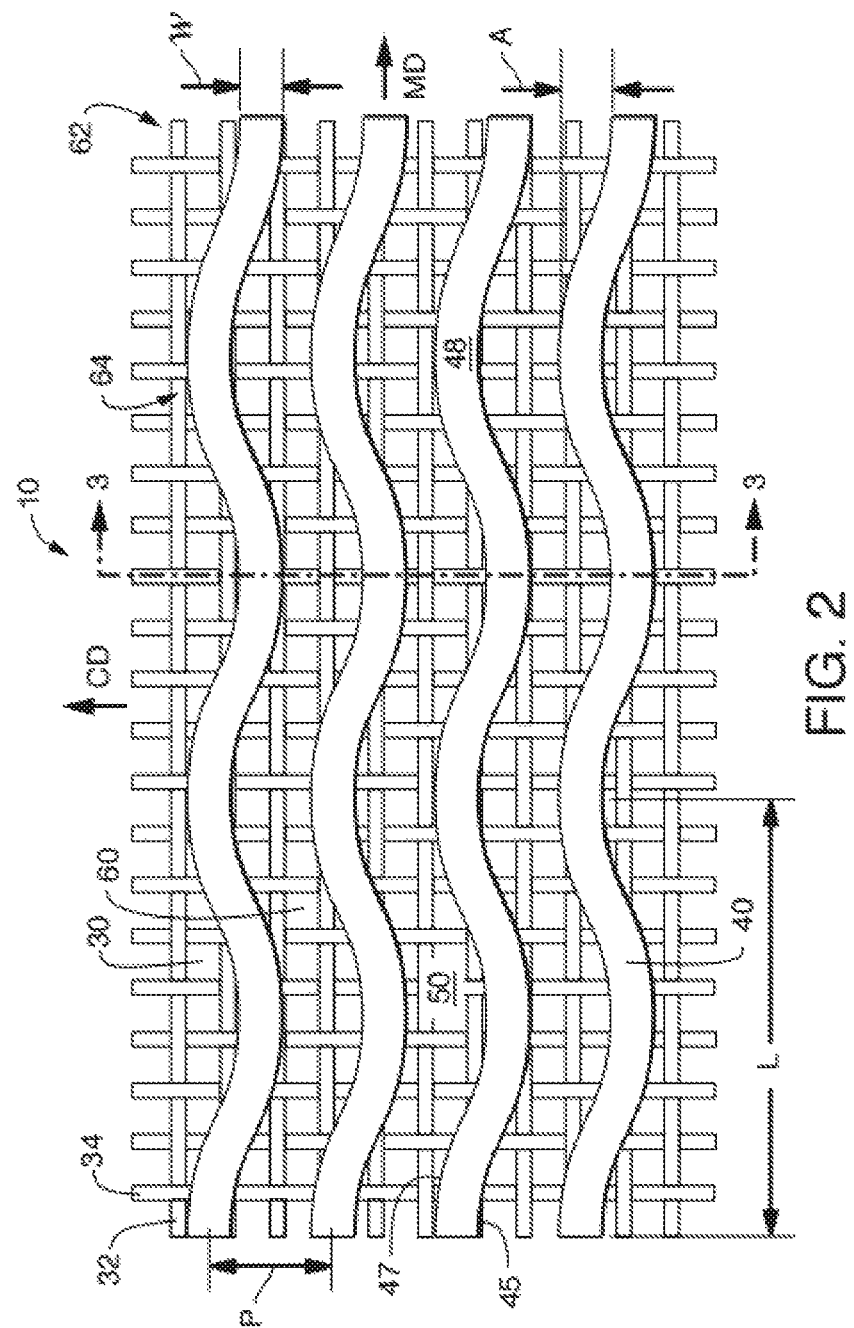
FIG. 2 is top perspective view of a fabric useful in the manufacture of tissue webs according to one embodiment of the present invention.

With further reference to FIGS. 1 and 2 a plurality of continuous elements 40 are disposed on the web-contacting surface 64 of the carrier structure 30. Each element 40 has a first dimension in a first direction in the plane of the top surface area, a second dimension in a second direction in the plane of the top surface area, the first and second directions being at right angles to each other. The extent of the element 40 in the first direction generally defines the element width (w). The continuous element 40 further comprises a top surface area 48 extending substantially along the second direction and a pair of opposed sidewalls 45, 47 extending in the z-direction and having a mean height (h). These dimensions being defined when the belt is in an uncompressed state.

Figure 3:
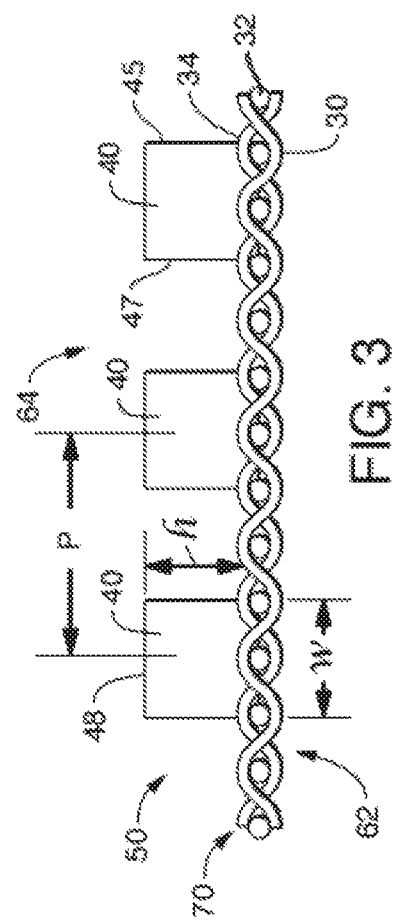
FIG. 3 is a cross section view of a fabric useful in the manufacture of tissue webs according to one embodiment of the present invention taken through line 3-3 of FIG. 2.

The continuous elements 40 generally extend in the z-direction (generally orthogonal to both the machine direction and cross-machine direction) above the plane 70 of the carrier structure 30. The elements may have straight sidewalls or tapered sidewalls and be made of any material suitable to withstand the temperatures, pressures, and deformations which occur during the papermaking process. In the embodiment illustrated in FIG. 3 the continuous elements 40 are similarly sized and have generally straight, parallel sidewalls 45, 47 providing the continuous elements 40 with a width (w), and a height (h). The width (w) and the height (h) may be varied depending on the desired degree of molding and the resulting tissue product properties. In certain embodiments the height (h) is less than about 0.7 mm, such as from about 0.5 and 0.7 mm. The height (h) is generally measured as the distance between the plane of the carrier structure and the top plane of the elevations.

Further, the continuous elements 40 may have a width (w) from about 0.5 to about 0.8 mm, and more preferably from about 0.6 to about 0.7 mm. The width is generally measured normal to the principal dimension of the elevation within the plane of the belt at a given location. Where the element 40 has a generally square or rectangular cross-section, the width (w) is generally measured as the distance between the two planar sidewalls 45, 47 that form the element 40. In those cases where the element does not have planar sidewalls, the width is measured along the base of the element at the point where the element contacts the carrier.

In a particularly preferred embodiment the continuous elements 40 have planar sidewalls 45, 47 such that the cross-section of the element has an overall square or rectangular shape. However, it is to be understood that the design element may have other cross-sectional shapes, such as triangular, convex or concave, which may also be useful in producing high bulk tissue products according to the present invention. Accordingly, in a particularly preferred embodiment the continuous elements 40 preferably have planar sidewalls 45, 47 and a square cross-section where the width (w) and height (h) are equal and vary from about 0.5 and 0.7 mm.

The spacing and arrangement of continuous elements may vary depending on the desired tissue product properties and appearance. In one embodiment a plurality of elements extend continuously throughout one dimension of the belt and each element in the plurality is spaced apart from the adjacent element. Thus, the elements may be spaced apart across the entire cross-machine direction of the belt, may endlessly encircle the belt in the machine direction, or may run diagonally relative to the machine and cross-machine directions. Of course, the directions of the elements alignments (machine direction, cross-machine direction, or diagonal) discussed above refer to the principal alignment of the elements. Within each alignment, the elements may have segments aligned at other directions, but aggregate to yield the particular alignment of the entire elements.

Generally the elements are spaced apart from one another so as to define a landing area there-between. In use, as the embryonic tissue web is formed fibers are deflected in the z-direction by the continuous elements, however, the spacing of elements is such that the web maintains a relatively uniform density. This arrangement provides the benefits of improved web extensibility, increased sheet bulk, better softness, and a more pleasing texture.

If the individual elements are too high, or the landing area is too small, the resulting sheet may have excessive pinholes and insufficient compression resistance, CD stretch, and CD TEA, and be of poor quality. Further, tensile strength may be degraded if the span between elements greatly exceeds the fiber length. Conversely, if the spacing between adjacent elements is too small the tissue will not mold into the landing areas without rupturing the sheet, causing excessive sheet holes, poor strength, and poor paper quality.

In addition to varying the spacing and arrangement of the elements along the carrier structure, the shape of the element may also be varied. For example, in one embodiment, the elements are substantially sinusoidal and are arranged substantially parallel to one another such that none of the elements intersect one another. As such, in the illustrated embodiment, the adjacent sidewalls of individual elements are equally spaced apart from one another. In such embodiments, the center-to-center spacing of design elements (also referred to herein as pitch or simply as p) may be greater than about 1.0 mm, such as from about 1.0 to about 20 mm apart and more preferably from about 2.0 to about 10 mm apart. In one particularly preferred embodiment the continuous elements are spaced apart from one-another from about 2.5 to about 4.0 mm. This spacing will result in a tissue web which generates maximum caliper when made of conventional cellulosic fibers. Further, this arrangement provides a tissue web having three dimensional surface topography, yet relatively uniform density.

In other embodiments the continuous elements may occur as wave-like patterns that are arranged in-phase with one another such that the pitch (p) is approximately constant. In other embodiments elements may form a wave pattern where adjacent elements are offset from one another. Regardless of the particular element pattern, or whether adjacent patterns are in or out of phase with one another, the elements are separated from one another by some minimal distance. Preferably the distance between continuous elements is greater than 0.5 mm and in a particularly preferred embodiment greater than about 1.0 mm and still more preferably greater than about 2.0 mm such as from about 2.0 to about 6.0 mm and still more preferably from about 2.5 to about 4.0 mm.

Where the continuous elements are wave-like, the elements have an amplitude (A) and a wavelength (L). The amplitude may range from about 2.0 to about 200 mm, in a particularly preferred embodiment from about 10 to about 40 mm and still more preferably from about 18 to about 22 mm. Similarly, the wavelength may range from about 20 to about 500 mm, in a particularly preferred embodiment from about 50 to about 200 mm and still more preferably from about 80 to about 120 mm.

While in certain embodiments the elements are continuous the invention is not so limited. In other embodiments the elements may be discrete. For clarity, the discrete elements will be referred to herein as protuberances. Generally the protuberances are discrete and spaced apart from one another. Each protuberance is joined to a reinforcing structure and extends outwardly from the web contracting plane of the reinforcing structure. In this manner the protuberances contact the tissue web during manufacture.

The protuberances may have a square horizontal and lateral (relative to the plane of the carrier structure) cross-sectional shape, however, the shape is not so limited. The protuberance may have any number of different horizontal and lateral cross-sectional shapes. For example, the horizontal cross-section may have a rectangular, circular, oval, polygonal or hexagonal shape. A particularly preferred protuberance has planar sidewalls which are generally perpendicular to the plane of the carrier structure. Alternatively, the protuberances may have a tapered lateral cross-section formed by sides that converge to yield a protuberance having a base that is wider than the distal end.

The individual protuberances may be arranged in any number of different manners to create a decorative pattern. In one particular embodiment protuberances are spaced and arranged in a non-random pattern so as to create a wave-like design. In the illustrated embodiment spaced between the decorative patterns are landing areas that provide a visually distinctive interruption to the decorative pattern formed by the individual spaced apart protuberances. In this manner, despite being discrete elements, the protuberances are spaced apart so as to form a visually distinctive curvilinear decorative element that extends substantially in the machine direction. Taken as a whole the discrete elements forms a wave-like pattern.

In other embodiments the protuberances may be spaced and arranged so as to form a decorative figure, icon or shape such as a flower, heart, puppy, logo, trademark, word(s), and the like. Generally the design elements are spaced about the support structure and can be equally spaced or may be varied such that the density and the spacing distance may be varied amongst the design elements. For example, the density of the design elements can be varied to provide a relatively large or relatively small number of design elements on the web. In a particularly preferred embodiment the design element density, measured as the percentage of background surface covered by a design element, is from about 10 to about 35 percent and more preferably from about 20 to about 30 percent. Similarly the spacing of the design elements can also be varied, for example, the design elements can be arranged in spaced apart rows. In addition, the distance between spaced apart rows and/or between the design elements within a single row can also be varied.

In certain embodiments the plurality of protuberances defining a given design element may be spaced apart from one another so as to define landing areas there between. The landing areas are generally bounded by the designs and coextensive with the top surface plane of the carrier structure. Landing areas are generally permeable to liquids and allow water to be removed from the cellulosic tissue web by the application of differential fluid pressure, by evaporative mechanisms, or both when drying air passes through the embryonic tissue web while on the papermaking belt or a vacuum is applied through the belt.

The elements may be formed from a polymeric material, or other material, applied and joined to the carrier structure in any suitable manner. Thus in certain embodiments elements are formed by extruding, such as that disclosed in U.S. Pat. No. 5,939,008, the contents of which are incorporated herein by reference in a manner consistent with the present invention, or printing, such as that disclosed in U.S. Pat. No. 5,204,055, the contents of which are incorporated herein by reference in a manner consistent with the present invention, a polymeric material onto the carrier structure. In other embodiments the design element may be produced, at least in some regions, by extruding or printing two or more polymeric materials.

The above mentioned belts may be used in a variety of processes for the manufacture of tissue webs and products according to the present invention. For example, the tissue web can be a wet-creped web, a calendered web, an embossed web, a through-air dried web, a creped through-air dried web, an uncreped through-air dried web, as well as various combinations of the above. In one particular embodiment of the present invention, however, the tissue web is made in an uncreped through-air dried process. Uncreped through-air dried tissue webs may provide various advantages in the process of the present invention. It should be understood, however, that other types of tissue webs can be used in the present invention. For example, in an alternative embodiment, a wet creped tissue web can be utilized.

Tissue webs manufactured by one of the foregoing processes generally have a topographical pattern such as discrete line elements, continuous line elements that impart the tissue product with a negative Poisson's ratio and other improved physical properties. An exemplary tissue product is illustrated in FIG. 4, which shows a planar tissue product 100 having a machine (MD) and a cross-machine (CD)

direction. The tissue product 100 has a first upper surface 102 and an opposed second lower surface 104. A wave-like topographical pattern 106 is disposed on the first upper surface 102. The wave-like topographical pattern 106 comprises a continuous line element substantially oriented in the machine direction (MD). The pattern generally consists of several wave-like elements 106 separated from one another by the planar surface 120 of the tissue web. While the illustrated wave-like topographical pattern 106 is continuous, in other embodiments the pattern may be semi-continuous or discontinuous.

Figure 4:
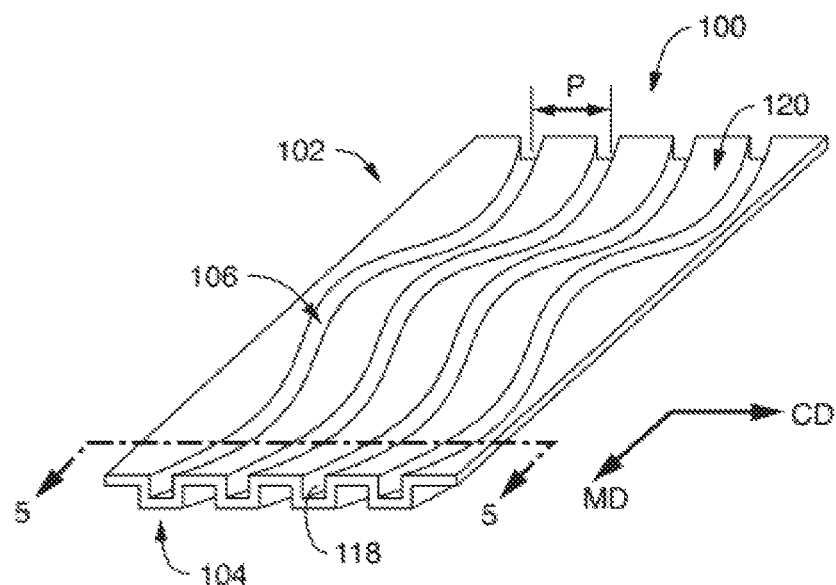
FIG. 4 is a perspective view of a tissue web according to one embodiment of the present invention.
Figure 5:
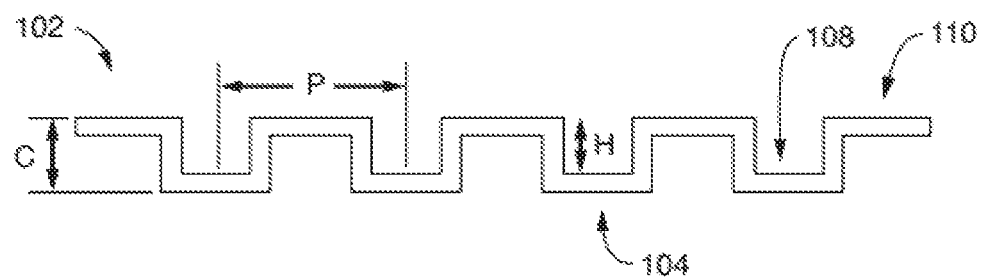
FIG. 5 is a cross section view of the tissue web of FIG. 4 through line 5-5.
Figure 6:
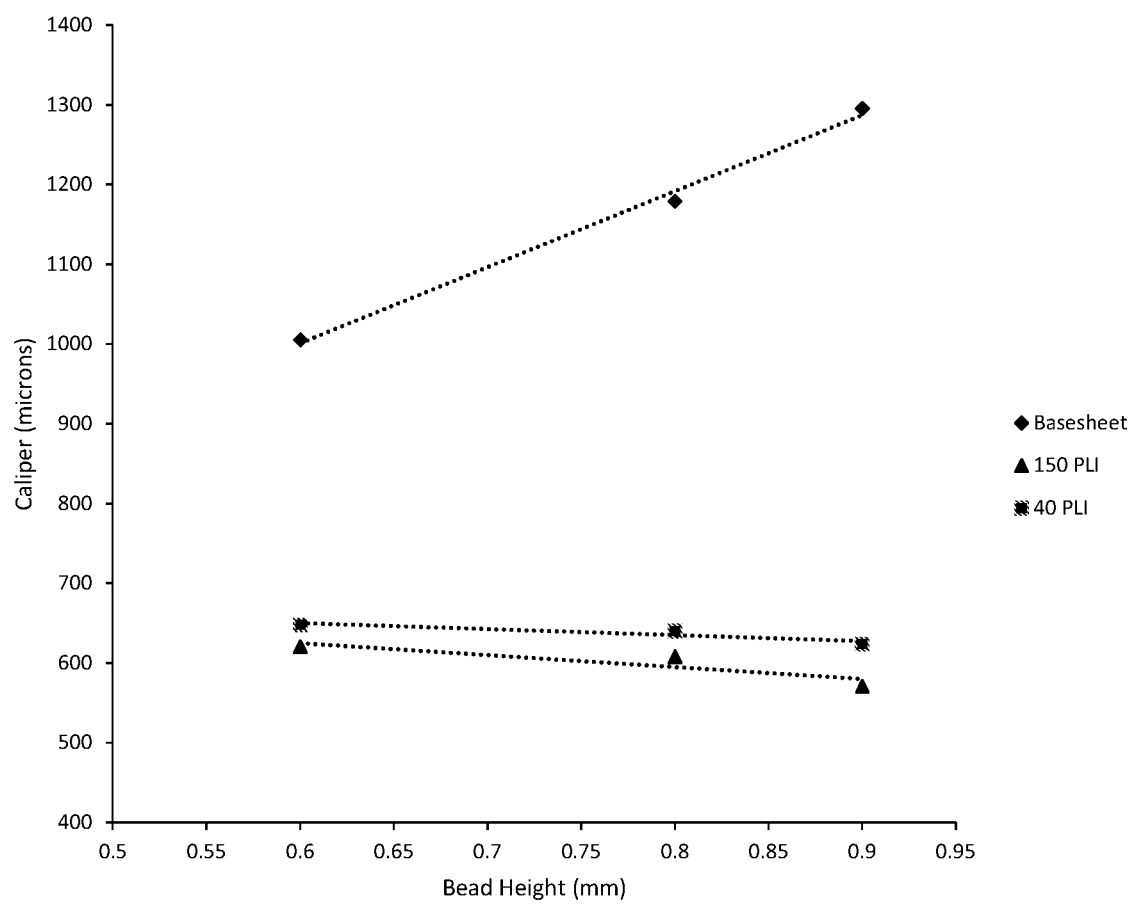
FIG. 6 is a graph plotting the effect of bead height (x-axis) on the caliper (y-axis) of base sheet (-♦-) and tissue products calendered at two different loads (150 PLI -▲- and 40 PLI -■-)
Figure 7:
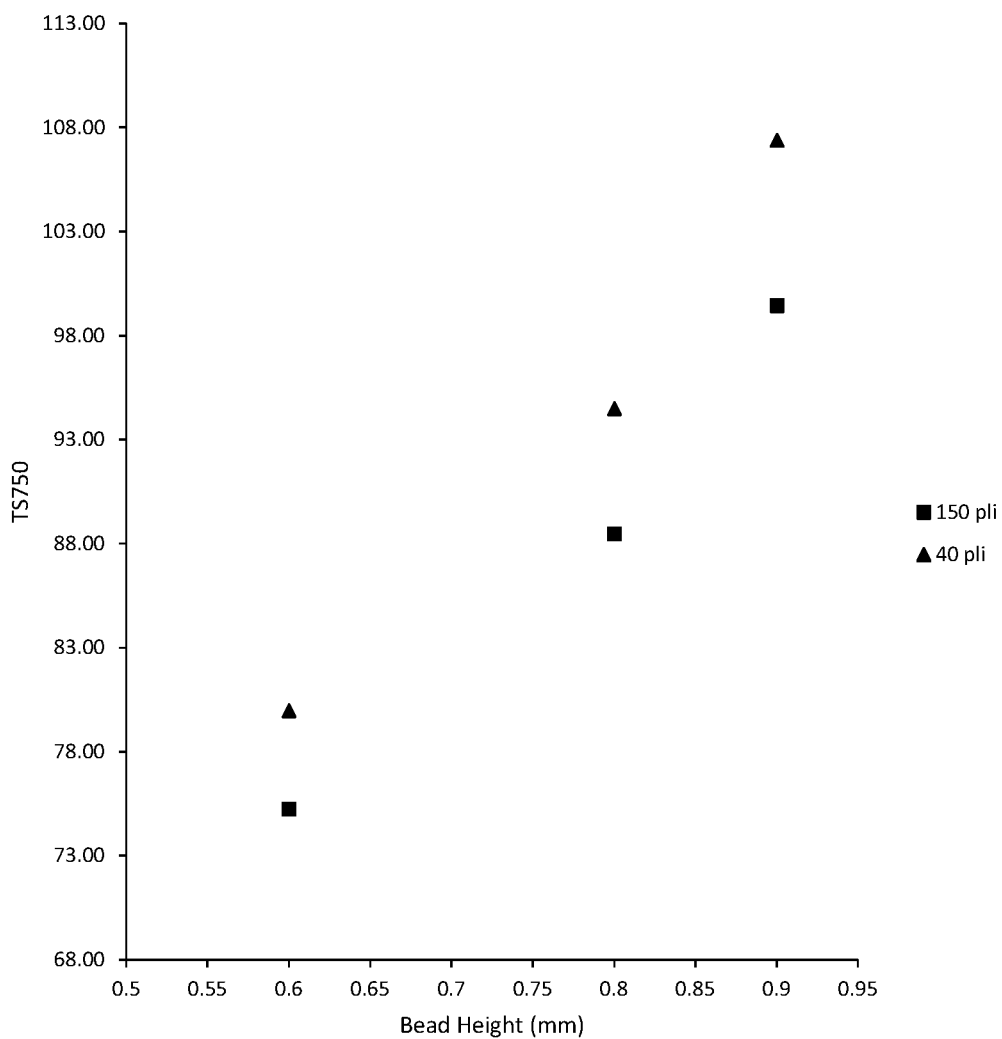
FIG. 7 is a graph plotting the effect of bead height (x-axis) on TS750 (y-axis) of tissue products calendered at two different loads (150 PLI -▲- and 40 PLI -■-)
Figure 8:
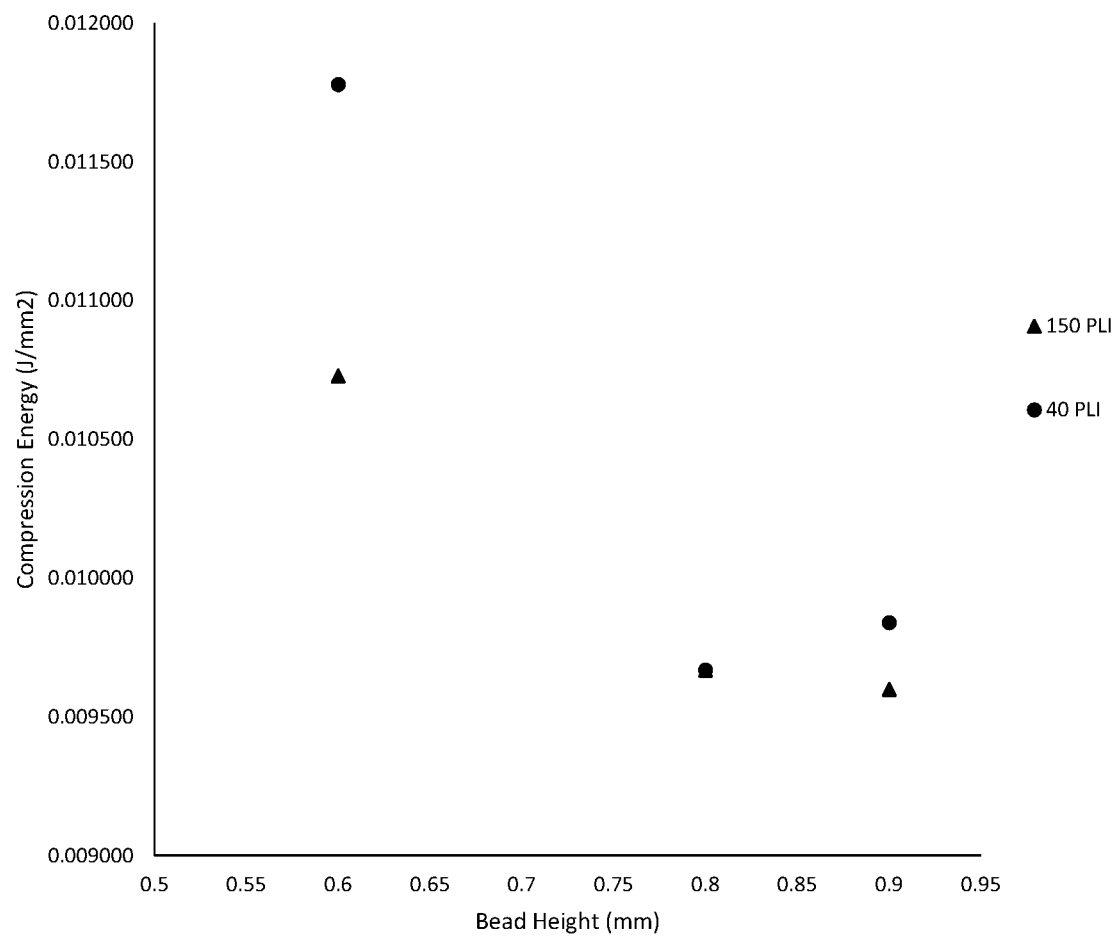
FIG. 8 is a graph plotting the effect of bead height (mm, x-axis) on Compression Energy (J/mm², y-axis) of tissue products calendered at two different loads (150 PLI -▲- and 40 PLI -■-).

With reference to FIGS. 4 and 5, the wave-like topographical pattern 106 comprises a plurality of spaced apart continuous line elements 118. Each line element 118 forms an oscillating pattern or wave with alternating peaks 110 and valleys 108. The line elements 118 are arranged generally parallel to one another such that no two line elements intersect one another. Further, in a preferred embodiment, the peaks 110 and valleys 108 of each element 118 and the valleys and peaks of each adjacent element are substantially in-phase with one another such that the spacing (P) between adjacent elements is substantially constant throughout the pattern 106. Generally, the spacing (P) between adjacent elements is measured from the centers of adjacent peaks.

Accordingly, in certain embodiments, the spacing (P) may range from about 1.0 to about 10 mm, such as from about 2.0 to about 5.0 mm and more preferably from about 3.0 to about 4.5 mm. Further, the width (W) of the line elements 118 themselves may range from about 0.5 to about 5.0 mm, such as from about 0.75 to about 3.0 mm and more preferably from about 0.9 to about 1.5 mm. At the foregoing spacing and widths the tissue webs of the present invention generally comprise from about 2.0 to about 4.0 elements per centimeter in the cross-machine direction, more preferably from about 2.2 to about 3.8 line elements per centimeter.

Tissue webs prepared according to the present invention may be converted into tissue products using any one of a number of well-known converting processes such as calendering, embossing and winding into rolled products. Generally the webs are converted into rolled bath tissue and towel products, which may comprise one, two or three plies where the plies may be prepared by the same process and be substantially similar or where they are prepared by different processes and have different properties.

Compared to tissue products prepared using through-air drying fabrics having element heights greater than about 0.7 mm, tissue products prepared according to the present invention generally have improved z-directional properties, such as improved K, $C_0$, and Compression Energy (E) and improved softness (measured as TS7). This effect is illustrated in the table below, which compares the physical properties of similarly manufactured and converted single-ply tissue products. Each of the products were manufactured in a substantially identical fashion with the exception of the through-air drying fabric element height.

TABLE 1

| Element Height (mm) | Sheet Bulk (cc/g) | GMT (g/3") | Stiffness Index | K | $C_0$ (mm) | E (J/mm$^2$) | TS7 |
|---|---|---|---|---|---|---|---|
| 0.9 | 14.0 | 1265 | 4.80 | 4.99 | 8.92 | 0.00960 | 11.34 |
| 0.8 | 14.5 | 1235 | 5.22 | 4.83 | 9.19 | 0.00967 | 10.37 |
| 0.6 | 15.0 | 1269 | 4.78 | 5.23 | 9.28 | 0.01073 | 9.72 |

Thus, in certain embodiments the present invention provides a non-compressively dewatered tissue product manufactured using a through-air drying fabric comprising a plurality of substantially machine direction oriented line elements having a height less than about 0.7 mm, such as from about 0.5 to about 0.7 mm. The resulting tissue product preferably has improved z-directional physical properties, such as improved K, $C_0$ and E. For example, in certain embodiments, the invention provides non-compressively dewatered tissue products having a K greater than about 5.0 and more preferably greater than about 5.2 and still more preferably greater than about 5.3, such as from about 5.0 to about 5.5 and a $C_0$ greater than about 9.0 mm and more preferably greater than about 9.4 mm and still more preferably greater than about 9.8 mm, such as from about 9.0 to about 10.2 mm. In other embodiments the invention provides tissue products having a GMT from about 800 to about 1,400 g/3", a sheet bulk greater than about 15.0, such as from about 15.0 to about 16.0 cc/g and a Compression Energy (E) greater than about 0.0100 to about 0.00130 J/mm$^2$.

In certain embodiments tissue webs produced according to the present invention may be subjected to additional processing after formation such as calendering in order to convert them into tissue products. The tissue webs of the present invention are surprisingly resilient and retain a high degree of bulk compared to similar webs prepared using through-air drying fabrics having continuous line elements with a height greater than about 0.7 mm. A comparison of various tissue webs illustrating this effect are shown in the table below.

TABLE 2

| Bead Height (mm) | Calender Load (pli) | Initial Sheet Bulk (cc/g) | Finished Sheet Bulk (cc/g) | Delta Sheet Bulk (%) | TS7 | TS750 |
|---|---|---|---|---|---|---|
| 0.9 | 150 | 34.6 | 14.0 | −59% | 11.34 | 99.45 |
| 0.8 | 150 | 26.6 | 14.5 | −46% | 10.37 | 88.49 |
| 0.6 | 150 | 22.9 | 15.0 | −34% | 9.72 | 75.26 |

In other embodiments, the increased resiliency allows the webs to be calendered to produce a soft tissue product without a significant decrease in bulk. Thus, the present invention provides bulky single-ply through-air dried tissue products, such as products having a sheet bulk greater than about 15.0 cc/g, that are also soft, such as having a TS7 less than about 10.5 and more preferably less than about 10.0, such as from about 9.0 to about 10.5. In other embodiments, the foregoing tissue products may also have improved smoothness, such as a TS750 less than about 85.0 and more preferably less than about 80.0, such as from about 70.0 to about 85.0.

While the present tissue webs and products have improved softness and smoothness, in preferred embodiments they comprise a three dimensional pattern disposed on at least one of their surfaces, which provides the sheet with surface topography. Preferably however, the topography is such that it is perceived by a consumer as being smooth. Accordingly, in certain embodiments, the surface of the sheet is textured but is relatively smooth to the touch such that S90 (an output of the FRT MicroSpy® Profile profilometer analysis described in the Test Methods section below) is less than about 0.60 mm, more preferably less than about 0.55 mm and still more preferably less than about 0.50 mm, such as from about 0.45 to about 0.60 mm, such as from about 0.45 to about 0.55 mm. In a particularly preferred embodiment the invention provides a tissue product having a relatively high caliper, such as greater than about 500 µm and more preferably greater than about 600 µm and a S90 less than about 0.60 mm, such as from about 0.45 to about 0.60 mm, such as from about 0.55 mm.

In addition to improving resiliency of the structure and enabling higher calendering loads, improvement of z-direction properties facilitates improved winding of rolled tissue products. Rolled tissue products formed according to the present disclosure generally have higher roll bulk at a given roll firmness. Further, the rolls generally have a surprising degree of interlocking between successive wraps of the spirally wound web, improving roll structure at a given roll firmness, more specifically allowing less firm rolls to be made without slippage between wraps. One measurement reduced nesting and improved roll structure, referred to herein as Roll Structure, is the product of Roll Bulk (expressed in cc/g) and caliper (express in cm) divided by Firmness (expressed in cm). Generally rolled tissue products of the present invention have a Roll Structure greater than about 1.0 and more preferably greater than about 1.25 and still more preferably greater than about 1.5, such as from about 1.0 to about 1.75. The foregoing Roll Structures are achieved at relatively high roll bulks, such as greater than about 10 cc/g and more preferably greater than about 12 cc/g, such as from about 10 to about cc/g.

Test Methods

Tissue Softness

Tissue softness was measured using an EMTEC Tissue Softness Analyzer ("TSA") (Emtec Electronic GmbH, Leipzig, Germany). The TSA comprises a rotor with vertical blades which rotate on the test piece applying a defined contact pressure. Contact between the vertical blades and the test piece creates vibrations, which are sensed by a vibration sensor. The sensor then transmits a signal to a PC for processing and display. The signal is displayed as a frequency spectrum. For measurement of TS7 values the blades are pressed against the sample with a load of 100 mN and the rotational speed of the blades is two revolutions per second.

The frequency analysis in the range of approximately 200 to 1000 Hz represents the surface smoothness or texture of the test piece. The peak in the frequency range between 200 to 1000 Hz is herein referred to as the TS750 value and is expressed as dB V2 rms. A high amplitude peak correlates to a rougher surface.

A further peak in the frequency range between 6 and 7 kHz represents the softness of the test piece. The peak in the frequency range between 6 and 7 kHz is herein referred to as the TS7 value and is expressed as dB V2 rms. The lower the amplitude of the peak occurring between 6 and 7 kHz, the softer the test piece.

In addition to TS750 and TS7, the analyzer reports a stiffness parameter (D) having units of mm/N. The stiffness parameter (D) is the deformation of the sample under a defined load.

Test samples were prepared by cutting a circular sample having a diameter of 112.8 mm. All samples were allowed to equilibrate at TAPPI standard temperature and humidity conditions for at least 24 hours prior to completing the TSA testing. Only one ply of tissue is tested. Multi-ply samples are separated into individual plies for testing. The sample is placed in the TSA with the softer (air contacting side in the case of uncreped samples or the dryer or Yankee contacting side in the case of creped samples) side of the sample facing upward. The sample is secured and the measurements are started via the PC. The PC records, processes and stores all of the data according to standard TSA protocol. The reported values are the average of five replicates, each one with a new sample.

Profilometry

The surface properties of tissue webs and products prepared as described herein were measured by first generating a digital image of the fabric contacting surface of a sample using an FRT MicroSpy® Profile profilometer (FRT of America, LLC, San Jose, Calif.) and then analyzing the image using Nanovea® Ultra software version 6.2 (Nanovea Inc., Irvine, Calif.). Samples (either base sheet or finished product) were cut into squares measuring 145×145 mm. The samples were then secured to the x-y stage of the profilometer using tape, with the fabric contacting surface of the sample facing upwards, being sure that the samples were laid flat on the stage and not distorted within the profilometer field of view.

Once the sample was secured to the stage, the profilometer was used to generate a three dimension height map of the sample surface. A 1602×1602 array of height values were obtained with a 30 µm spacing resulting in a 48 mm MD×48 mm CD field of view having a vertical resolution of 100 µm and a lateral resolution of 6 µm. The resulting height map was exported to .sdf (surface data file) format.

Individual sample .sdf files were analyzed using Nanovea® Ultra version 6.2 by performing the following functions:

(1) Using the "Thresholding" function of the Nanovea® Ultra software, the raw image (also referred to as the field) is subjected to thresholding by setting the material ratio values at 0.5 to 99.5 percent such that thresholding truncates the measured heights to between the 0.5 percentile height and the 99.5 percentile height;

(2) Using the "Fill In Non-Measured Points" function of the Nanovea® Ultra software the non-measured points are filled by a smooth shape calculated from neighboring points;

(3) Using the "Filtering–Wavyness+Roughness" function of the Nanovea® Ultra software the field is spatially high pass filtered (roughness) using a Robust Gaussian Filter with a cutoff wavelength of 0.5 to 24.0 mm and selecting "manage end effects";

(4) Using the "Parameter Tables" study function of the Nanovea® Ultra software ISO 25178 Values Sq (root mean square deviation, expressed in units of mm) is calculated and reported;

(5) Using the "Abbott-Firestone Curve" study function of the Nanovea® Ultra software an Abbott-Firestone Curve is generated from which "interactive mode" is selected and a histogram of the measured heights is generated, from the histogram an S90 value (95 percentile height (c2) minus the 5 percentile height (c1), expressed in units of mm) is calculated.

Based upon the foregoing, two values, indicative of surface texture are reported—Sq and S90, which all have units of mm. The units have been converted to microns for use herein.

Compression Energy

Generally Compression Energy (E) refers to the energy required to compress the sheet from its initial base sheet caliper down to its final finished product caliper. Compression Energy is calculated by integrating the compression curve from the zero load height down to the finished product caliper as:

$$E=\int_{c_{fp}}^{\infty} P\,dC$$

where P is the pressure at any given caliper (C) and is defined as:

$$P = P_0\left(\frac{C_0}{C}\right)^K$$

where:
"P" is the pressure (MPa);
"$P_0$" is a reference pressure equal to 0.002 MPa;
"C" is the caliper of the stack under a pressure P of 1.0 psi, measured during the second compression cycle;
"$C_0$" is the initial caliper of the stack under the 0.002 MPa reference pressure (having units of mm); and
"K" is the finished product exponential compression modulus.

The "exponential compression modulus" (K) is found by least squares fitting of the caliper (C) and pressure data from a compression curve for the sample. The compression curve is measured by compressing a stack of twenty sheets between parallel plates on a suitable tensile frame (for example the MTS Systems Sintech 11S from MTS® Corporation). The upper platen is to be 57 mm in diameter and the lower platen 89 mm in diameter. The stack of sheets should contain twenty sheets (102 mm by 102 mm square) stacked with their machine direction and cross-machine directions aligned. The sample stack should be placed between the platens with a known separation of greater than the unloaded stack height. The platens should then be brought together at a rate of 12.7 mm/minute while the force is recorded with a suitable load cell (say 100 N Self ID load cell from MTS® Corporation). The force data should be acquired and saved at 100 Hz. The compression should continue until the load exceeds 44.5 Newtons, at which point the platen should reverse direction and travel up at a rate of 12.7 mm/minute until the force decreases below 0.18 Newtons. The platen should then reverse direction again and begin a second compression cycle at a rate of 12.7 mm/minute until a load of 44.5 Newtons is exceeded. The load data should then be converted to pressure data by dividing by the 2552 mm² contact area of the platens to give pressures in N/mm² or MPa. The pressure versus stack height data for the second compression cycle between the pressures of 0.07 kPa and 17.44 kPa is then least squares fit to the above expression after taking the logarithm of both sides to obtain:

$$\ln(P)=a-K\ln(C)$$

where "a" is a constant. The slope from the least squares fit is the exponential compression modulus (K). Five samples are to be tested per code and the average value of "K" reported.

By integrating the compression curve above, the Compression Energy (E) required to compress the sheet to any final caliper "C" is thus defined as follows:

$$E = \int_C^{\infty} P\,dC = \frac{P_0 C_0^K}{(K-1)C^{K-1}}$$

where "K" is the exponential compression modulus (referred to herein as K) from the finished product test described above, "C" is the caliper of the stack under a pressure P of 1.0 psi, measured during the second compression cycle, and "$C_0$" is the initial caliper of the stack under the 0.002 MPa reference pressure. When calculating the Compression Energy (E) for a given sheet, both C and $C_0$ are divided by the number of sheets in the stack, here twenty sheets.

Roll Firmness

Roll Firmness was measured using the Kershaw Test as described in detail in U.S. Pat. No. 6,077,590, which is incorporated herein by reference in a manner consistent with the present disclosure. The apparatus is available from Kershaw Instrumentation, Inc. (Swedesboro, N.J.) and is known as a Model RDT-2002 Roll Density Tester.

Examples

Base sheets were made using a through-air dried papermaking process commonly referred to as "uncreped through-air dried" ("UCTAD") and generally described in U.S. Pat. No. 5,607,551, the contents of which are incorporated herein in a manner consistent with the present invention. Base sheets with a target bone dry basis weight of about 42 grams per square meter (gsm) were produced. The base sheets were then converted and spirally wound into rolled tissue products.

In all cases the base sheets were produced from a furnish comprising northern softwood kraft and eucalyptus kraft using a layered headbox fed by three stock chests such that the webs having three layers (two outer layers and a middle layer) were formed. The two outer layers comprised eucalyptus (each layer comprising 30 percent weight by total weight of the web) and the middle layer comprised softwood and eucalyptus. The amount of softwood and eucalyptus kraft in the middle layer was maintained for all inventive samples—the middle layered comprised 29 percent (by total weight of the web) softwood and 11 percent (by total weight of the web) eucalyptus. Strength was controlled via the addition of a cationic strength agent, such as those marketed under the trade name FennoBond 3000 (Kemira Chemicals Inc., Atlanta, Ga.), cationic starch, such as those marketed under the trade name Redibond 2038A (Ingredion, Westchester, Ill.) and/or by refining the furnish.

The tissue web was formed on a Voith Fabrics TissueForm V forming fabric, vacuum dewatered to approximately 25 percent consistency and then subjected to rush transfer when transferred to the transfer fabric. The transfer fabric was the fabric described as "Fred" in U.S. Pat. No. 7,611,607 (commercially available from Voith Fabrics, Appleton, Wis.).

The web was then transferred to a through-air drying fabric comprising a printed silicone pattern disposed on the sheet contacting side. The silicone formed a wave-like pattern on the sheet contacting side of the fabric. The pattern properties are summarized in Table 3, below.

TABLE 3

| Element Height (mm) | Element Angle | Element Wavelength (mm) | Element Amplitude (mm) | CD Center-Center Spacing (mm) |
|---|---|---|---|---|
| 0.6 | 11.3 | 100 | 10 | 3.08 |

Transfer to the through-drying fabric was done using vacuum levels of about 10 inches of mercury at the transfer. The web was then dried to approximately 98 percent solids before winding. The base sheet was calendered using a conventional polyurethane/steel calender system comprising a 40 P&J polyurethane roll on the air side of the sheet and a standard steel roll on the fabric side. The calender load was varied as set forth in Table 4, below. The calendered web was then converted into a rolled product comprising a single-ply. The finished products were subjected to physical analysis, which is summarized in Tables 4 and 5, below.

TABLE 4

| Sample | Calender Load (pli) | BW (gsm) | GMT (g/3") | Caliper (microns) | Sheet Bulk (cc/g) | Firmness (mm) | Roll Bulk (cc/g) | Roll Structure |
|---|---|---|---|---|---|---|---|---|
| 1 | 40 | 41.7 | 839 | 630.8 | 15.0 | 5.9 | 11.88 | 1.27 |
| 2 | 150 | 42.2 | 877 | 594.4 | 14.0 | 7.5 | 11.59 | 0.92 |
| 3 | 40 | 41.3 | 1157 | 653.3 | 15.7 | 5.1 | 11.84 | 1.52 |
| 4 | 150 | 41.2 | 1269 | 625.2 | 15.0 | 6.7 | 11.87 | 1.11 |

TABLE 5

| Sample | GM Slope (kg) | Stiffness Index | K | $C_0$ (mm) | E (J/mm$^2$) | S90 | TS7 | TS750 | D (mm/N) |
|---|---|---|---|---|---|---|---|---|---|
| 1 | 5.32 | 6.34 | 5.187 | 9.753 | 0.01115 | 0.538 | 9.41 | 73.52 | 3.16 |
| 2 | 5.61 | 6.40 | 5.37 | 9.061 | 0.01094 | 0.482 | 8.53 | 74.89 | 3.27 |
| 3 | 6.21 | 5.36 | 5.337 | 10.01 | 0.01178 | 0.529 | 10.54 | 79.98 | 2.96 |
| 4 | 6.07 | 4.78 | 5.23 | 9.281 | 0.01073 | 0.513 | 9.72 | 75.26 | 3.00 |

To further explore the relationship between the height of the line element used to mold the tissue web and the physical properties of the resulting tissue product, additional samples were prepared substantially as described above with the exception of the height of the through-air drying fabric elements. The properties of the through-air drying fabrics used to manufacture the various samples are summarized in Table 6, below.

TABLE 6

| Sample | Element Height (mm) | Element Angle | Element Wavelength (mm) | Element Amplitude (mm) | CD Center-Center Spacing (mm) |
|---|---|---|---|---|---|
| Inventive | 0.6 | 11.3 | 100 | 10 | 3.08 |
| Control 1 | 0.9 | 21.8 | 100 | 20 | 4.6 |
| Control 2 | 0.8 | 11.3 | 100 | 10 | 4.1 |

The properties of the resulting base sheets are summarized in Table 7, below.

TABLE 7

| Sample | Caliper (microns) | Sheet Bulk (cc/g) | GMT (g/3") |
|---|---|---|---|
| Inventive | 1005 | 22.9 | 1536 |
| Control 1 | 1295 | 34.6 | 1468 |
| Control 2 | 1179 | 26.6 | 1545 |

The base sheet was calendered using a conventional polyurethane/steel calender system comprising a 40 P&J polyurethane roll on the air side of the sheet and a standard steel roll on the fabric side. The calender load was varied as set forth in Table 8. The calendered web was then converted into a rolled product comprising a single-ply. The finished products were subjected to physical analysis, the results of which are summarized in Tables 8 and 9, below.

TABLE 8

| Sample | Calender Load (Pli) | BW (gsm) | GMT (g/3") | Caliper (microns) | Sheet Bulk (cc/g) | Delta Caliper (%) | Delta Sheet Bulk (%) | Delta GMT (%) |
|---|---|---|---|---|---|---|---|---|
| Control 1-1 | 150 | 40.7 | 1265 | 571.0 | 14.0 | −56% | −59% | −14% |
| Control 2-1 | 150 | 42.0 | 1235 | 608.1 | 14.5 | −48% | −46% | −20% |
| Inventive 1 | 150 | 41.2 | 1269 | 620.3 | 15.0 | −38% | −34% | −17% |
| Control 2-1 | 40 | 41.1 | 1303 | 623.8 | 15.2 | −52% | −56% | −11% |
| Control 2-2 | 40 | 41.8 | 1274 | 640.1 | 15.3 | −46% | −42% | −18% |
| Inventive 2 | 40 | 41.3 | 1157 | 648.2 | 15.7 | −36% | −31% | −25% |

TABLE 9

| Sample | GM Slope (kg) | Stiffness Index | K | $C_0$ (mm) | E (J/mm$^2$) | S90 | TS7 | TS750 | D (mm/N) |
|---|---|---|---|---|---|---|---|---|---|
| Control 1-1 | 6.07 | 4.80 | 4.99 | 8.92 | 0.00960 | 0.591 | 11.34 | 99.45 | 3.17 |
| Control 2-1 | 6.44 | 5.22 | 4.83 | 9.19 | 0.00967 | 0.586 | 10.37 | 88.49 | 2.85 |
| Inventive 1 | 6.07 | 4.78 | 5.23 | 9.28 | 0.01073 | 0.513 | 9.72 | 75.26 | 3.00 |
| Control 2-1 | 6.36 | 4.88 | 5.15 | 9.50 | 0.00984 | 0.641 | 11.98 | 107.39 | 3.32 |
| Control 2-2 | 6.44 | 5.05 | 4.83 | 9.37 | 0.00967 | 0.637 | 10.48 | 94.49 | 2.83 |
| Inventive 2 | 6.21 | 5.36 | 5.34 | 10.01 | 0.01178 | 0.529 | 10.54 | 79.98 | 2.96 |

Accordingly, in a first embodiment the present invention provides a non-compressively dewatered single-ply tissue product comprising a first and a second side and a topographical pattern comprising a plurality of substantially machine direction oriented line elements disposed on a first side thereof, the tissue product having a Compression Energy (E) greater than about 0.0100 J/mm$^2$, such as from about 0.0100 to about 0.0130 J/mm$^2$, a GMT from about 500 to about 1,500 g/3" and a sheet bulk greater than about 15.0 cc/g.

In a second embodiment the present invention provides the tissue product of the first embodiment wound into a roll, the wound roll having a Firmness less than about 7.5 mm.

In a third embodiment the present invention provides the tissue product of the first or the second embodiment wherein the line elements are formed by manufacturing the tissue product using a through-air drying fabric having corresponding line elements having a height less than about 0.7 mm.

In a fourth embodiment the present invention provides the tissue product of the first through the third embodiments wherein the line elements are continuous.

In a fifth embodiment the present invention provides the tissue product of the first through the fourth embodiments having a basis weight from about 25 to about 60 gsm and a caliper from about 600 to about 700 microns.

In a sixth embodiment the present invention provides the tissue product of the first through the fifth embodiments having a TS7 less than about 10.5 and a TS750 less than about 85.0.

In a seventh embodiment the present invention provides the tissue product of the first through the sixth embodiments having a Stiffness Index less than about 7.5.

In an eighth embodiment the present invention provides a single-ply non-compressively dewatered tissue product having a caliper greater than about 600 µm, a Stiffness Index less than about 7.5 and a Compression Energy (E) greater than about 0.0100 J/mm$^2$.

In a ninth embodiment the present invention provides the tissue product of the eighth embodiment having a sheet bulk greater than about 15.0 cc/g.

In a tenth embodiment the present invention provides the tissue product of the eighth or the ninth embodiments wherein the product comprises a single-ply wound into a roll having a Roll Firmness less than about 7.5 mm.

In an eleventh embodiment the present invention provides the tissue product of any one of the eighth through the tenth embodiments wherein the web has been converted into a rolled tissue product having S90 less than about 0.55 mm.

In a twelfth embodiment the present invention provides the tissue product of any one of the eighth through the eleventh embodiments having a GMT from about 700 to about 1,500 g/3" and Basis Weight from about 25 to about 60 gsm.

In a thirteenth embodiment the present invention provides the tissue product of any one of the eighth through the twelfth embodiments having a K greater than about 5.0.

In a fourteenth embodiment the present invention provides the tissue product of any one of the eighth through the thirteenth embodiments having a $C_O$ greater than about 9.5 mm.

In a fifteenth embodiment the present invention provides the tissue product of any one of the eighth through the fourteenth embodiments having a TS7 less than about 10.5 and a TS750 less than about 85.0.

In a sixteenth embodiment the present invention provides a method of manufacturing a soft and resilient tissue product comprising the steps of forming a fiber slurry; depositing the fiber slurry on a forming fabric; partially dewatering the slurry to form a wet tissue web; transferring the wet tissue web to a through-air drying fabric comprising a support structure and a plurality of linear elements extending in the z-direction therefrom, the elements having a height from about 0.5 to about 0.7 mm; through-air drying the wet tissue web to form a dried tissue web; and calendering the dried tissue web and winding the calendered web into a rolled tissue product having a Roll Firmness less than about 7.5 mm and a sheet bulk greater than about 15.0 cc/g.

In a seventeenth embodiment the present invention provides the method of the sixteenth embodiment wherein the step of calendering is carried out by passing the dried tissue web through a nip created by a steel roll and a polyurethane roll, the nip having a nip load from about 40 to about 200 pli and more preferably from about 100 to about 160 pli.

In an eighteenth embodiment the present invention provides the method of the sixteenth or the seventeenth embodiments wherein the step of calendering comprises passing the web through a nip having a load of at least about 40 pli, wherein the step of calendering reduces the sheet bulk less than about 50 percent.

In a nineteenth embodiment the present invention provides the method any one of the sixteenth through eighteenth embodiments wherein the dried tissue web has a sheet bulk greater than about 15 cc/g and the calendered web has a sheet bulk greater than about 12 cc/g.

We claim:

1. A method of manufacturing a soft and resilient tissue product comprising the steps of:
    a. forming a fiber slurry;
    b. depositing the fiber slurry on a forming fabric;
    c. partially dewatering the slurry to form a wet tissue web;
    d. transferring the wet tissue web to a through-air drying fabric comprising a support structure and a plurality of linear elements extending in the z-direction therefrom, the elements having a height from about 0.4 to about 0.7 mm;
    e. through-air drying the wet tissue web to form a dried tissue web; and
    f. calendering the dried tissue web and winding the calendered web into a rolled tissue product having a Roll Firmness less than about 7.5 mm and a sheet bulk greater than about 15.0 cc/g.

2. The method of claim 1 wherein the step of calendering is carried out by passing the dried tissue web through a nip created by a steel roll and a polyurethane roll, the nip having a nip load from about 20 to about 200 pli.

3. The method of claim 1 wherein the rolled tissue product has a caliper greater than about 600 microns.

4. The method of claim 1 wherein the rolled tissue product has a S90 from about 0.45 to about 0.55 mm.

5. The method of claim 1 wherein the rolled tissue product has a Caliper Under Load ($C_O$) from about 9.5 to about 10.5.

6. The method of claim 1 wherein the rolled tissue product has a Compression Energy (E) from about 0.010 to about 0.0130 J/mm2.

7. The method of claim 1 wherein at least a portion of the plurality of linear elements comprise a continuous line element.

8. The method of claim 7 wherein the continuous line elements have a pair of planar sidewalls and a rectangular cross-sectional shape.

9. The method of claim 8 wherein the continuous line elements are similarly sized.

10. The method of claim 9 wherein the continuous line elements have a width (w) from about 0.5 to about 0.8 mm.

11. The method of claim 7 wherein the continuous elements are spaced apart from one-another from about 2.5 to about 4.0 mm.

12. The method of claim 7 wherein the continuous elements form a wave-like pattern and are evenly spaced apart from one-another from about 2.5 to about 4.0 mm.

13. The method of claim 12 wherein the continuous elements have a wavelength ranging from about 50 to about 200 mm.

14. The method of claim 1 wherein at least a portion of the plurality of linear elements comprise continuous line elements having a rectangular cross-section and a width from about 0.9 to about 1.5 mm, the continuous line elements arranged in a wave-like pattern with adjacent continuous line elements evenly spaced apart from one another from about 3.0 to about 4.5 mm.

15. The method of claim 1 wherein the product has a Roll Structure from about 1.0 to about 1.75.

* * * * *